Patented Aug. 17, 1954

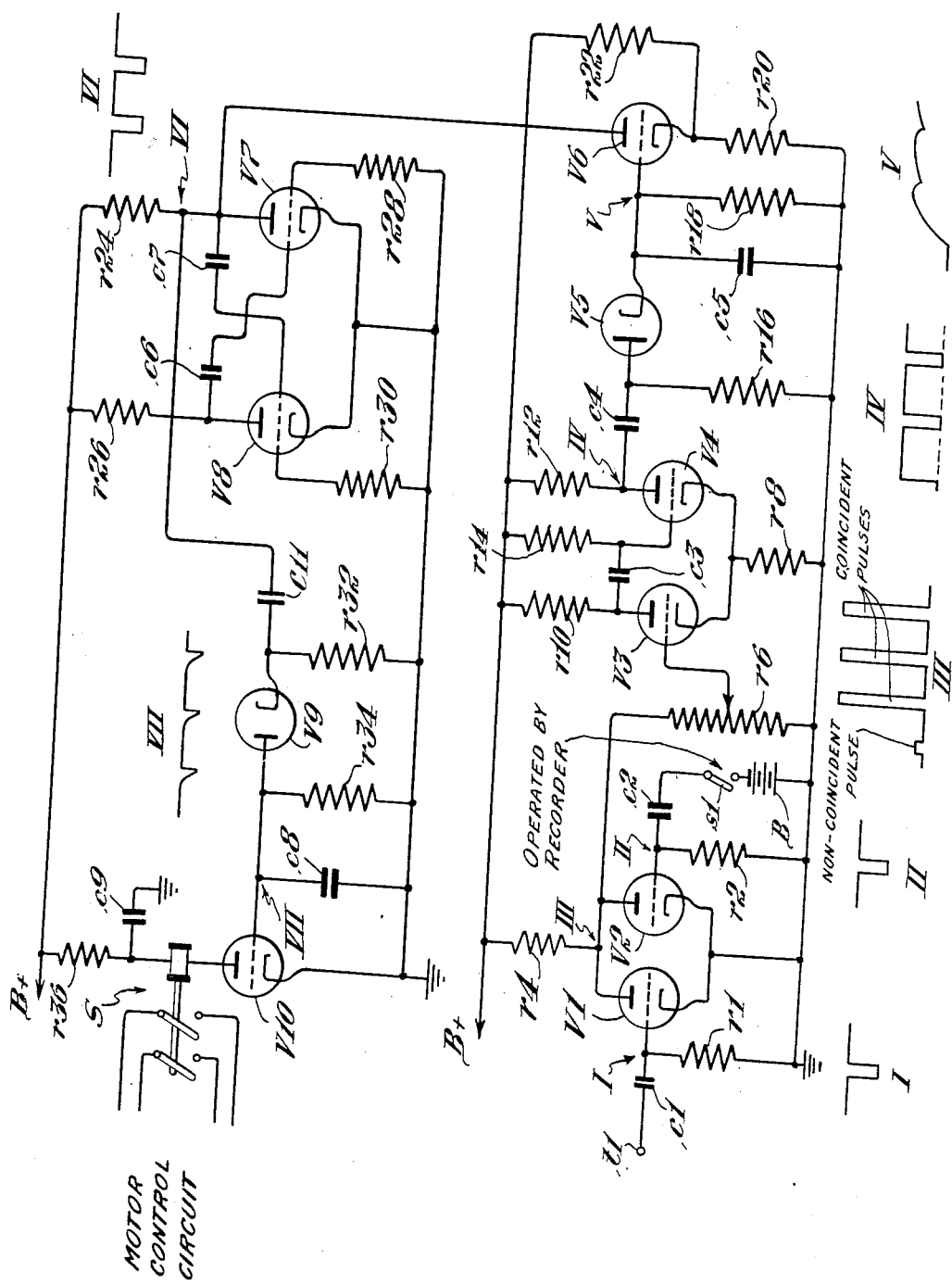

2,686,832

UNITED STATES PATENT OFFICE 2,686,832

FACSIMILE FRAMING SYSTEM

Richard E. Fricks, Weymouth, Mass., assignor to Alden Products Co., Brockton, Mass., a corporation of Massachusetts Application February 9, 1952, Serial No. 270,824

11 Claims. (Cl. 178—69.5)

In facsimile it is necessary not only that the moving electrode of the receiving apparatus be in synchronism with the scanner of the transmitting apparatus, but these elements must be framed, i. e. their mechanical phase relationship must be such that as the scanning spot starts across a new scanning line, the effective recording spot of the moving electrode must be simultaneously starting across a corresponding line upon the recording medium. Early slow speed systems were phased manually by observation of the copy, but with increases in speed it was found necessary to introduce a phasing signal which usually consists of a pulse equal or greater in amplitude than the greatest marking signal level which is transmitted for approximately 15 degrees of the total of each scanning cycle.

Several automatic phasing systems have been developed, which are operated by the input signal pulses to frame the receiver with respect to the transmitter or scanner. These various systems have to depend upon friction clutches, latches, slipping of poles of the driving motor and the use of an auxiliary phasing motor. The simpler systems employing mechanical devices have been characterized by requiring that the recorder be operated at the start of the transmission. The more complicated electrical systems have generally been found to be expensive and subject to erroneous slippage.

Accordingly the objects of this invention are to provide framing apparatus which will bring the recorder of a facsimile system into proper phase with the scanner, which is completely automatic in operation, which will bring the recorder into proper phase relationship during the transmission after a loss of phase due to either electrical or mechanical interference, which is rapid and positive in operation, which is not subject to slippage, which requires a minimum of maintenance, and which advances the art generally.

An electrical framing circuit according to the present invention includes means having a switching element, which may be either mechanically or photoelectrically operated in synchronism with the moving recording electrode of a recorder, for producing auxiliary pulses whose occurrence corresponds with a predetermined position of the electrode. Means are provided for comparing the time of occurrence of the auxiliary pulses with the time of occurrence of framing pulses from a scanner, for example by applying the auxiliary pulses to one control electrode and the framing pulses to the other electrode respectively of a pair of parallel connected vacuum tubes. The anodes of the tubes are connected by means of a network with a comparatively slow running multivibrator whose output controls the operation of a suitable framing device such as a sensitive relay whose contacts are connected in the circuit of the driving moving electrode of the recorder so that the momentary opening of the contacts permits the motor to slip preferably only by one pole. The network preferably includes a second multivibrator which is normally quiescent but which when excited by the relatively high potential resulting from the coincidence of an auxiliary and a framing pulse has an output of a single pulse of comparatively long duration. The successive long pulses resulting when the auxiliary and framing pulses coincide are applied, preferably through a buffer tube, as a bias to the slow running multivibrator so that the multivibrator is conditioned to render the framing means inoperative.

These and further objects and aspects will be apparent from the following description of a specific embodiment of the invention referring to a drawing wherein the single figure is that of a wiring diagram.

In the illustrated embodiment vacuum tubes V1 and V2 are connected in parallel by joining anode and cathode of one of the tubes to the corresponding anode and cathode of the other tube, the cathodes of both tubes being directly grounded. Two grid resistors $r1$ and $r2$ are connected respectively between the control electrodes of the tubes V1 and V2 and ground. Framing pulses from a facsimile scanner, which forms no part of the present invention and which will not be discussed further other than to say it can be anyone of the well known types, are applied to an input terminal $t1$ which is connected to the control electrode of the tube V1 by means of a coupling capacitor $c1$. Auxiliary pulses of substantially the same magnitude as the framing pulses are applied to the control electrode of the tube V2 by means of a coupling capacitor $c2$. The auxiliary pulses are generated by means of a switch $s1$ which is connected in series with the capacitor $c2$ between the control electrode of the tube V2 and the negative terminal of a direct power source such as the battery B, whose positive terminal is grounded. The switch $s1$ is operated by the movable electrode of the recorder (not shown) being connected thereto either by a mechanical link or arranged to interrupt a light beam to operate a photoelectric cell relay whose contacts perform the function of the switch. In either case the switch (or contacts) are operated each time the electrode reaches a predetermined position.

The anodes of the tubes V1 and V2 are connected to the positive terminal of a conventional "B" power supply (not shown) by means of a common load resistor $r4$. The anodes of the tubes V1 and V2 are also connected through a voltage dividing potentiometer $r6$ with the control electrode of a tube V3 which forms one half of a normally quiescent multivibrator or long pulse generator. The cathode of the tube V3 and the cathode of its companion multivibrator tube V4 are grounded through a common cathode resistor r8. The anodes of the tubes V3 and V4 are connected to the positive terminal of the "B" power supply by load resistors r10 and r12 respectively. The anode of the tube V3 is coupled to the control electrode of the tube V4 by means of a capacitor c3. The latter control electrode is also connected to the positive "B" power supply terminal by a resistor r14.

The output of the multivibrator is taken from the anode of the tube V4 which is linked with the anode of a diode vacuum tube V5 by a coupling capacitor c4. The common terminal of the latter anode and the capacitor c4 is grounded through a resistor r16. The cathode of the diode V5 is directly connected to the control electrode of a buffer vacuum tube V6. A capacitor c5 and a resistor r18, which form a time delay or integrating circuit, are connected in parallel between the control electrode of the tube V6 and ground. The cathode of the tube V6 is linked to the common junction of two resistors r20 and r22, which are connected in series between the positive terminal and the "B" power supply and ground, to form a voltage divider.

The anode of the tube V6 is directly connected to the anode of a tube V7 which comprises one half of a relatively slow free running multivibrator, that is, a multivibrator whose frequency is slower than the frequencies of the framing and auxiliary pulse, which frequency is related to the motor inertia as explained hereinafter. The control electrode of the tube V7 is connected to the second tube V8 of the multivibrator by a capacitor c6. The anode of the tube V7 is cross connected to the control electrode of the tube V7 by a similar capacitor c7. A direct potential is applied to the anodes of the tubes V7 and V8 through load resistors r24 and r26 which are interposed between the respective anodes and the positive terminal of the "B" power supply. The cathodes of the tubes V7 and V8 are both directly linked to ground. The circuits for the control electrodes for the tubes V7 and V8 are completed through grid resistors r28 and r30 respectively.

The output from the slow running multivibrator is taken from the anode of the tube V7 which is connected to the cathode of a diode vacuum tube V9 by means of a capacitor c10, the cathode also being tied to ground by means of a resistor r32. The anode of the diode is connected to the control electrode of an amplifier vacuum tube V10 whose cathode is grounded. A capacitor c8 is connected in parallel with a resistor r34 between ground and the common junction of the control electrode of the tube V10 and the anode of tube V9 to form a time delay network. The anode of the tube V10 is linked with the positive terminal of the "B" power supply by means of a load which consists of a resistor r36 connected in series with the coil of a relay S. The relay contacts are connected to interrupt the circuit energizing the synchronous motor (not shown) which operates the moving electrode of a facsimile recorder, for example one similar to that shown in the copending application of Milton Alden, Serial No. 149,182, filed March 11, 1950. The relay coil and tube V10 are shunted by a large by-pass capacitor c9.

The following list of typical component values for the above described circuit is given only by way of example for use with a 300 volt "B" power supply it being understood that the invention is not limited to the use of components having such values as the values marked with asterisks depend upon the characteristics of the motor being controlled by the circuit.

V1, V2—12AU7   c1—0.1 mfd.    c6—0.14 fmd.*
V3, V4—12AU7   c2—0.1 mfd.    c7—0.05 mfd.*
V5, V9—6AL6    c3—0.006 mfd.  c8—0.1 mfd.
V6, V10—12AU7  c4—0.1 mfd.    c9—40 mfd.
V7, V8—12AU7   c5—0.1 mfd.    c10—0.1 mfd.

r1—1M      r14—12M    r26—1M
r2—1M      r16—10M    r28—1M*
r4—270K    r18—15M    r30—1M*
r6—1M      r20—20M    r32—12M
r8—2K      r22—270K   r34—1M
r10—68K    r24—1M     r36—47K
r12—10K    Relay coil—4500 ohms Operation of the above described circuit can best be understood with reference to the diagrams identified by Roman numerals which represent the respective variations of the potential with respect to ground as a function of time at the junctions in the wiring diagram bearing the same indicia. Accordingly diagram I represents one of a series of framing pulses such as are incorporated as a part of a conventional facsimile signal as are applied to the control electrode of the tube V1 as described above. Diagram II represents a negative pulse such as is generated by the closing of the switch s1 upon each revolution of the recording electrode and applied to the control electrode of the tube V2.

As the control electrodes of the tubes V1 and V2 are not biased, it will be evident that in the absence of an input signal these tubes will conduct heavily, the current therethrough being limited only by the common load resistor r4. The resultant voltage drop across the resistor r4 sharply lowers the anode potential (at point III) with respect to ground. When a negative pulse such as is shown in either Diagram I or II is applied to the control electrode of a respective tube, the tube is cut off so that the voltage rises at point III due to the decrease in the current flow through the load resistor r4. If the occurrence of a framing pulse coincides with the occurrence of an auxiliary pulse (indicating that the scanner and transmitter are in phase) both of the tubes V1 and V2 are cut off so that a further pulse having a voltage approximately equal to that of the "B" power supply potential is applied at point III. By proper proportioning of the value of the load with respect to the plate resistance of the tubes, the potential of the further pulse at point III when pulse coincidence occurs can be made ten times as great as the potential when only one of the tubes is cut off by a random pulse as is shown in Diagram II.

The tube V3 of the long pulse generator or multivibrator is normally cut off and the tube V4 is normally conducting so that the voltage drop through the load resistor r12 lowers the potential of the point IV below that of the "B" power supply. This equilibrium condition is not upset by the rise in voltage at point III due to the impressing of a random pulse upon the control electrode of either tube V1 or V2 as discussed above. When however a coincidence of pulses occurs the high positive voltage applied to the control electrode of the tube V3 causes the tube to conduct, and the increased current through the resistor r8 results in the potential on the cathode of the tube V4 becoming more positive with respect to the control electrode so that the tube V4 is cut off and the potential at point IV rises sharply to the value of the "B" power supply. The tube V4 remains cut off until the capacitor $c3$ discharges through the resistor $r14$ to raise the potential upon the control electrode with respect to the cathode to a point where the tube again conducts. The multivibrator then remains quiescent until it is again excited by the coincidence of a framing and an auxiliary pulse. When the scanner and recorder are in phase as indicated by the coincidence of successive framing and auxiliary pulses the potential at point IV varies as a series of comparatively long positive pulses as is indicated in Diagram IV. After the short negative pulses interposed between the long positive pulses have been substantially eliminated by the integrating action of the time delay circuit consisting of the capacitor $c5$ and the resistor $r18$, the resulting direct potential is impressed upon the control electrode of a buffer tube V6 so that the tube conducts.

If the framing and auxiliary pulses do not coincide the multivibrator remains quiescent so that a potential which is sufficiently relatively negative to cut off the tube V6 is impressed upon the control electrode thereof. The values of the components of the time delay circuit or integrator are made such that potential upon the control electrode of the tube V6 will remain positive enough so that the tube continues to conduct if one long positive pulse from the multivibrator is skipped, but which will drop below the cut off potential of the tube during the interval of two successive skipped pulses.

The tube V6 controls the action of the slow running multivibrator by clamping the anode of the tube V7 at a relatively negative potential when the tube V6 conducts thereby to stop the operation of the multivibrator when the coincidence of framing and auxiliary pulses indicates that the scanner and recorder are in synchronism. When the operation of the multivibrator is stopped, control electrode of the tube V10 is returned to zero bias or ground potential through the resistor $r34$, so that the tube conducts. The resulting current flow through the coil of the relay S transfers the relay contacts to maintain the recorder electrode driving motor energized.

When the scanner and recorder are not in synchronism, the tube V6 is cut off so that the slow running multivibrator operates in the well-known manner so that an output taken from the anode of the tube V7 consists of a series of negative pulses which occur at the rate of 1 to 2 per second as is shown in the Diagram VI, which is the rate at which the inertia of the motor permits it to slip one pole and regain speed. These pulses drive the control electrode of the tube V10 negative so that the current flow through the tube is momentarily interrupted. The multivibrator output pulses are modified by the time delay circuit consisting of the resistor $r34$ and the capacitor $c8$ to form short negative control pulses shown in Diagram VII each of which momentarily interrupts the current flow through the tube V10 and hence through relay S only for a sufficient time to permit the recorder electrode driving motor to slip one pole. From the foregoing it will be understood that the period necessary for the motor to slip off of one pole and regain speed at another pole is much longer than the time required merely to slip off the pole, and hence the slow running multivibrator has a long period (one-half to one second) whereas the control pulses are short for the reason stated. This slipping action is continued by each succeeding negative pulse until the scanner and recorder are in phase as evidenced by the coincidence of the framing and auxiliary pulses whereupon the relay remains locked in as has been described heretofore until such time as such pulses again are not coincident.

It should be understood that the present disclosure is for the purpose of illustration only and that this invention includes all modifications and equivalents which fall within the scope of the appended claims.

I claim:

1. An electrical circuit for framing the moving electrode of a facsimile recorder in accordance with framing pulses from a scanner, said circuit including switching means operated in synchronism with the movement of said electrode, means including said switching means for producing auxiliary pulses whose occurrence corresponds with a predetermined position of the electrode, means for comparing the time of occurrence of the auxiliary pulses with the time of the occurrence of the framing pulses, said comparing means producing further pulses when said framing and auxiliary pulses coincide, framing means for varying the relative phase relationship of said electrode, a free running multivibrator whose output controls the operation of the framing means, and means interconnecting the pulse comparing means with the multivibrator so that the operation of the multivibrator including an integrator for converting said further pulses into a control potential for holding the multivibrator inoperative is conditioned by the pulse comparing means to render the framing means inoperative when the auxiliary and framing pulses do coincide, said comparing means producing no pulses and said integrator producing no control potential thereby allowing the multivibrator to operate independently and render the framing means momentarily operative when the auxiliary and framing pulses do not coincide.

2. An electrical circuit for framing the moving electrode of a facsimile recorder in accordance with framing pulses from a scanner, said circuit including switching means operated in synchronism with the movement of said electrode, means including said switching means for producing auxiliary pulses whose occurrence corresponds with a predetermined position of the electrode, means for comparing the time for occurrence of the auxiliary pulses with the time of the occurrence of the framing pulses, framing means for varying the relative phase relationship of said electrode, a free running multivibrator whose output controls the operation of the framing means, a generator responsive to said comparing means when said framing means and auxiliary pulses coincide for producing relatively long pulses, means for integrating said long pulses to produce a control potential and means for coupling said potential to said multivibrator to hold the multivibrator inoperative thereby to render the framing means inoperative when the auxiliary and framing pulses do coincide, said comparing means producing no pulses and said integrator producing no control potential thereby by allowing the multivibrator to operate independently and render the framing means momentarily operative when the auxiliary and framing pulses do not coincide.

3. An electrical circuit for framing the motor driving the moving electrode of a facsimile recorder in accordance with framing pulses from a scanner, said circuit including switching means operated in synchronism with the movement of said electrode, means including said switching means for producing auxiliary pulses whose occurrence corresponds with a predetermined position of the electrode, means for comparing the time of occurrence of the auxiliary pulses with the time of the occurrence of the framing pulses, said comparing means producing further pulses when said framing and auxiliary pulses coincide, framing means for varying the phase relationship of said electrode including a relay whose contacts are connected to open the energizing circuit for said motor so that the motor slips, a free running multivibrator whose output controls the operation of the relay, and means interconnecting the pulse comparing means with the multivibrator including an integrator for converting said further pulses into a control potential for holding the multivibrator inoperative to bias the multivibrator to close the motor energizing circuit when the auxiliary and framing pulses do coincide, said comparing means producing no pulses and said integrator producing no control potential thereby allowing the multivibrator to operate independently and render the framing means momentarily operative when the auxiliary and framing pulses do not coincide.

4. A circuit according to claim 3 wherein the period of the multivibrator is substantially equal to the time interval required for the synchronous motor to slip one pole and regain speed at another pole.

5. A circuit according to claim 3 wherein a time delay network having a time constant substantially greater than the period of the multivibrator is interposed between the multivibrator and the relay.

6. An electrical circuit for framing the moving recording electrode of a facsimile recorder in accordance with framing pulses from a scanner, said circuit including switching means operated in synchronism with the movement of said electrode, means including said switching means for producing auxiliary pulses whose occurrence corresponds with a predetermined position of the electrode, means including two vacuum tubes connected in parallel for comparing the time of occurrence of the auxiliary pulses with the time of the occurrence of the framing pulses, the control electrode of one tube being connected to have the framing pulses impressed thereupon, the control electrode of the second tube being connected to said switching means so that the auxiliary pulses are impressed thereupon, said tubes producing further pulses when the framing and auxiliary pulses coincide, framing means for varying the relative phase relationship of said recording electrode, a free running multivibrator whose output controls the operation of the framing means, and means interconnecting the anodes of said tubes with the multivibrator including an integrator for converting said further pulses into a control potential for holding the multivibrator inoperative to bias the multivibrator to render the framing means inoperative when the auxiliary and framing pulses do coincide, said comparing means producing no pulses and said integrator producing no control potential thereby allowing the multivibrator to operate independently and render the framing means momentarily operative when the auxiliary and framing pulses do not coincide.

7. An electrical circuit for framing the moving electrode of a facsimile recorder in accordance with framing pulses from a scanner, said circuit including switching means operated in synchronism with the movement of said electrode, means including said switching means for producing auxiliary pulses whose occurrence corresponds with a predetermined position of the electrode, means for comparing the time of occurrence of the auxiliary pulses with the time of the occurrence of the framing pulses, said comparing means producing further pulses when said framing and auxiliary pulses coincide, framing means for varying the relative phase relationship of said electrode, a slow running multivibrator whose output controls the operation of the framing means, and a normally quiescent free running multivibrator and an integrator interconnecting the pulse comparing means with the slow running multivibrator, said normally quiescent multivibrator producing long pulses in response to each of said further pulses, and said integrator converting said long pulses into a control potential for the slow running multivibrator, thereby biasing the slow running multivibrator to render the framing means inoperative when the auxiliary and framing pulses do coincide, said comparing means producing no pulses and said integrator producing no control potential thereby allowing the multivibrator to operate independently and render the framing means momentarily operative when the auxiliary and framing pulses do not coincide.

8. A circuit according to claim 7 wherein the framing device includes a relay whose contacts are connected to open the energizing circuit for said motor so that the motor slips.

9. A circuit according to claim 1 characterized by pulse forming means responsive to the free running multivibrator to apply a short pulse to said framing means.

10. A circuit according to claim 9 further characterized in that said pulse forming means comprises a time delay circuit limiting the length of said short pulses to a time sufficient to permit the recorder electrode to slip one pole.

11. For synchronizing the phase relation between a facsimile scanning device and transmitted framing pulses, electrical apparatus comprising means for generating auxiliary pulses in synchronism with said device, means for comparing said pulses and for generating further pulses when said framing and auxiliary pulses coincide, an integrator for converting said further pulses into a control potential, control pulse forming means including a free-running multivibrator held inoperative by said potential for producing short control pulses when said potential is removed, and framing means momentarily responsive to said pulses to vary the phase relation of said scanning device and framing pulses, so that the operation of the multivibrator is conditioned by the pulse comparing means to render the framing means inoperative when the auxiliary and framing pulses do coincide, said comparing means producing no pulses, and said integrator producing no control potential thereby allowing the multivibrator to operate independently and render the framing means momentarily operative when the auxiliary and framing pulses do not coincide.

References Cited in the file of this patent

UNITED STATES PATENTS

| Number | Name | Date |
| --- | --- | --- |
| 2,309,622 | Anderson | Feb. 2, 1942 |
| 2,522,919 | Artzt | Sept. 19, 1950 |
| 2,597,743 | Millspaugh | May 20, 1952 |